US008824945B2

(12) United States Patent
Tong

(10) Patent No.: US 8,824,945 B2
(45) Date of Patent: Sep. 2, 2014

(54) METALLIC NANOPARTICLE REINFORCED POLYIMIDE FOR FUSER BELT WITH HIGH THERMAL CONDUCTIVITY

(75) Inventor: Yuhua Tong, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 221 days.

(21) Appl. No.: 13/024,089

(22) Filed: Feb. 9, 2011

(65) Prior Publication Data

US 2012/0201580 A1 Aug. 9, 2012

(51) Int. Cl.
*G03G 15/20* (2006.01)
*C08K 3/10* (2006.01)

(52) U.S. Cl.
USPC .......... 399/329; 399/333; 524/413

(58) Field of Classification Search
USPC .......... 399/329
See application file for complete search history.

(56) References Cited

U.S. PATENT DOCUMENTS 5,891,986 A * 4/1999 Yamaguchi et al. .......... 528/310
6,007,657 A 12/1999 Eddy et al.
6,137,984 A * 10/2000 Higashi et al. .......... 399/329
6,181,891 B1 * 1/2001 Higashi et al. .......... 399/70
6,295,434 B1 9/2001 Chang et al.
6,395,444 B1 5/2002 Riehle et al.
6,652,433 B1 * 11/2003 Ishikawa et al. .......... 492/56
7,057,631 B2 * 6/2006 Nakamura et al. .......... 347/115
7,233,765 B2 * 6/2007 Murai et al. .......... 399/341
7,491,281 B2 2/2009 Darcy, III et al.
2005/0121437 A1 * 6/2005 Spohn et al. .......... 219/635
2005/0208398 A1 * 9/2005 Ohmura et al. .......... 430/45
2006/0127686 A1 * 6/2006 Meloni .......... 428/473.5
2006/0188300 A1 * 8/2006 Matsunaka et al. .......... 399/333
2006/0263532 A1 * 11/2006 Kaplan et al. .......... 427/385.5
2006/0263533 A1 * 11/2006 Kaplan et al. .......... 427/385.5
2006/0263555 A1 * 11/2006 Iwamoto .......... 428/36.9
2008/0119616 A1 * 5/2008 Donovan et al. .......... 525/432
2008/0124994 A1 * 5/2008 Spohn et al. .......... 442/289
2008/0242832 A1 * 10/2008 Nakamura et al. .......... 528/335
2009/0258211 A1 * 10/2009 Yoshinaga et al. .......... 428/220
2010/0032308 A1 * 2/2010 Qi et al. .......... 205/164
2010/0055365 A1 * 3/2010 Nakajima et al. .......... 428/36.9
2010/0065675 A1 * 3/2010 Taft et al. .......... 242/571
2010/0104332 A1 * 4/2010 Law et al. .......... 399/328
2010/0221410 A1 * 9/2010 Kaplan et al. .......... 427/58
2010/0221444 A1 * 9/2010 Kaplan et al. .......... 427/425
2010/0247779 A1 * 9/2010 Yashiki .......... 427/359
2010/0290809 A1 * 11/2010 Suzuki et al. .......... 399/162
2012/0148851 A1 * 6/2012 Wu .......... 428/447
2012/0178332 A1 * 7/2012 Uchida et al. .......... 442/351
2012/0202078 A1 * 8/2012 Wu .......... 428/447
2012/0273731 A1 * 11/2012 Moralez et al. .......... 252/500

FOREIGN PATENT DOCUMENTS

CN 101698746 A * 4/2010
JP 2003177630 A * 6/2003 .......... G03G 15/24

OTHER PUBLICATIONS

Machine translation of CN 101698746 A.*
Machine translation of CN 101698746.*
Machine translation of JP 2003177630 A.*

* cited by examiner

*Primary Examiner* — David Bolduc
(74) *Attorney, Agent, or Firm* — MH2 Technology Law Group LLP

(57) ABSTRACT

A fuser belt for an electrostatographic device and methods for making the fuser belt can include the use of a polyimide and a plurality of copper nanoparticles. The use of copper nanoparticles can result in a fuser belt having a lower heat capacity and a higher thermal conductivity than conventional fuser belts.

8 Claims, 2 Drawing Sheets

METALLIC NANOPARTICLE REINFORCED POLYIMIDE FOR FUSER BELT WITH HIGH THERMAL CONDUCTIVITY

FIELD OF THE EMBODIMENTS

The present teachings relate generally to fuser member methods and structures, for example fuser members used for electrostatographic devices.

BACKGROUND OF THE EMBODIMENTS

In electrostatography, for example xerography, electrophotographic imaging or electrostatographic imaging, an imaging process includes forming a visible toner image on a support surface such as a paper sheet, plastics, films, etc. The visible toner image is often produced by forming a latent electrostatic image on a photoreceptor, which can be transferred to an intermediate transfer belt, and then fixed onto the support surface using a heated fuser belt or a heated roll fuser to form a permanent image.

Roll fusers can be heated to a higher temperature than a fuser belt, and can provide high speed, high throughput, and a high-quality image on the support surface. However, roll fusers require an initial warm-up time and therefore do not provide an instant-on printer. Fuser belts for image fixing are heated to a lower temperature than roll fusers and can provide an instant-on printer with lower energy consumption. However, they generally result in a lower speed than a printer having a roll fuser. Fuser belt materials typically include high-performance engineering polymers such as polyimide and polyimide copolymers. Polymers, however, can also suffer from high heat capacity and low thermal conductivity which can result in the fuser belt storing thermal energy rather than transferring it to the toner and the support surface during image fixing.

Thus, there is a need to overcome the problems associated with fuser belts.

SUMMARY OF THE EMBODIMENTS

The following presents a simplified summary in order to provide a basic understanding of some aspects of one or more embodiments of the present teachings. This summary is not an extensive overview, nor is it intended to identify key or critical elements of the present teachings nor to delineate the scope of the disclosure. Rather, its primary purpose is merely to present one or more concepts in simplified form as a prelude to the detailed description presented later.

An embodiment of the present teachings can include a method for forming a fuser belt for an electrostatographic device, comprising forming a liquid coating solution using a method comprising combining a polyimide component comprising a mixture of between about 0.1 wt % and about 60 wt % solid content and between about 40 wt % and about 99.9 wt % solvent with copper nanoparticles, wherein the polyimide component within the liquid coating solution comprises between about 80.0 wt % and about 99.9 wt % and the copper nanoparticles within the liquid coating solution comprises between about 0.01 wt % and about 3.0 wt %. The liquid coating can be applied to a solid substrate, and the liquid coating solution is cured and removed from the solid substrate.

Another embodiment of the present teachings can include a fuser belt for an electrostatographic image forming device. The fuser belt can include polyimide of between about 85 wt % and about 99.8 wt %, copper nanoparticles of between about 0.1 wt % and about 15 wt %, and a Young's modulus of between about 1000 megapascals (MPa) and about 10000 MPa.

Additionally, the present teachings can include an electrostatographic image forming apparatus comprising a fuser belt. The fuser belt can include polyimide of between about 85 wt % and about 99.9 wt %, copper nanoparticles of between about 0.1 wt % and about 15 wt %, a break strength of between about 20 megapascals (MPa and about 500 MPa, and a Young's modulus of between about 1000 MPa and about 10000 MPa. The electrostatic image forming apparatus can further include at least one photoreceptor configured to receive a latent image and at least one charging device configured to write the latent image onto the at least one photoreceptor, wherein the fuser belt is configured to fuse a toner image onto a permanent substrate.

BRIEF DESCRIPTION OF THE DRAWINGS

The accompanying drawings, which are incorporated in and constitute a part of this specification, illustrate embodiments of the present teachings and together with the description, serve to explain the principles of the disclosure. In the figures.

Figure 1:
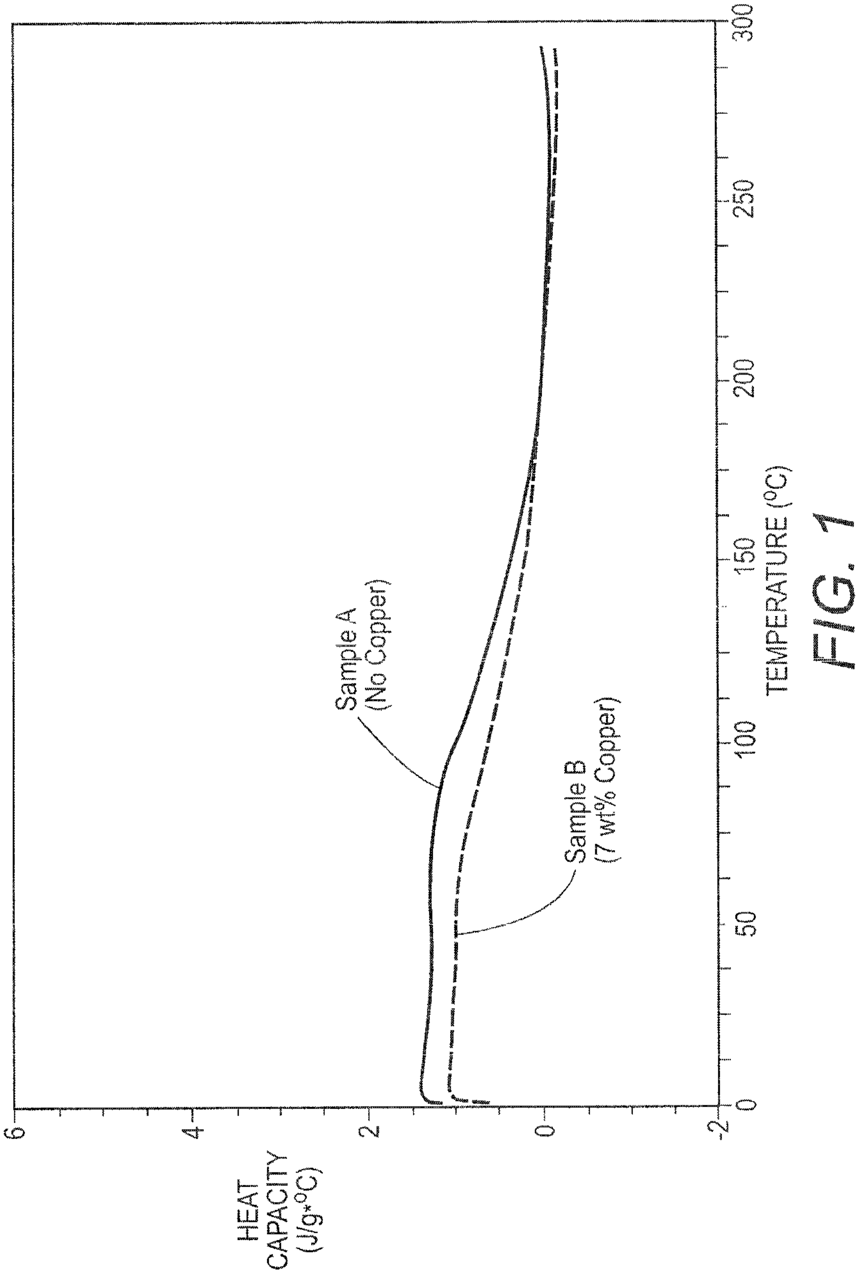
FIG. 1 is a graph comparing the heat capacity of a fuser belt formed with pure polyimide compared to a fuser belt formed with polyimide and copper nanoparticles.

It should be noted that some details of the FIGS. have been simplified and are drawn to facilitate understanding of the present teachings rather than to maintain strict structural accuracy, detail, and scale.

DESCRIPTION OF THE EMBODIMENTS

Reference will now be made in detail to the present embodiments of the present teachings, an example of which is illustrated in the accompanying drawings. Wherever possible, the same reference numbers will be used throughout the drawings to refer to the same or like parts.

As used herein, the word "printer" encompasses any image forming apparatus that performs a print outputting function for any purpose, such as a digital copier, bookmaking machine, facsimile machine, a multi-function machine, etc. The word "polymer" encompasses any one of a broad range of carbon-based compounds formed from long-chain molecules including thermosets, thermoplastics, resins such as polycarbonates, epoxies, and related compounds known to the art.

A fuser belt can include a base material which forms a bulk of the structure, and may include other additives in varying amounts. It is desirable for a fuser belt to have specific properties. For example, desirable fuser belt properties include a low heat capacity, a high thermal conductivity, good flexibility, and sufficient strength. A fuser belt having a low heat capacity stores less thermal energy and thus transfers heat more readily to the support surface through physical contact, which results in enhanced fusing of the toner to the support surface. Similarly, a fuser belt with a high thermal conductivity absorbs and releases thermal energy better than a material with a low thermal conductivity, resulting in a more even heating of the fuser belt. However, materials used in the manufacture of fuser belts, such as polyimides and polyimide copolymers, typically have a high heat capacity and a low thermal conductivity.

In an embodiment of the present teachings, metallic nanoparticles can be incorporated into the solution which is used to form the fuser belt. For example, copper nanoparticles can be blended into a polyamidic acid coating solution for flow-coating to form a seamless fuser belt. After heating, drying, and curing, the copper nanoparticle reinforced polyimide film can result in improved thermal stability under exposure to both air and nitrogen.

In comparing a fuser belt formed using a pure polyimide with a fuser belt formed with a polyimide mixed with copper nanoparticles according to an embodiment of the present teachings, no significant difference was found in either the Young's modulus or the break strength.

Additionally, a fuser belt produced by introducing copper nanoparticles into a polyimide material to result in a completed fuser belt having 7% by weight (i.e., 7 wt %) copper nanoparticles resulted in a reduction of the heat capacity compared to a belt having a polyimide coating formed without copper nanoparticles. The heat capacity at 50° C. was reduced to 1.021 Jules/gram·° C. (J/g·° C.) from 1.281 J/g·° C., a 20% reduction. At 100° C., the heat capacity was reduced to 0.6218 J/g·° C. from 0.9748 J/g·° C., a 36% reduction. At 150° C., the heat capacity was reduced to 0.2136 J/g·° C. from 0.3534 J/g·° C., a 28% reduction. Thus a fuser belt according to an embodiment of the present teachings can have a thermal transfer efficiency which is more desirable than a conventional fuser belt, which results in a fuser belt which is better suited for high speed copiers and printers.

The preparation of samples described herein included a polyimide varnish (polyamidic acid) solution in a quantity of solvent. A suitable polyamidic solution can include U-Varnish type S, available from UBE Industries of Tokyo, Japan. U-Varnish is provided as a mixture of 18 wt % (±1 wt %) solid content in a solvent. The solvent for this formulation is N-methyl-2-pyrrolidone (NMP). During sample testing, the U-Varnish was further diluted with additional NMP such that the resulting polyamide solution had a solid concentration of 13.7 wt % to facilitate better coating quality.

To ensure proper coating of the fuser belt base solution onto a solid substrate such as a stainless steel substrate during fuser belt formation, a non-ionic surfactant and a surface tension reducer were provided in the liquid coating solution. A suitable non-ionic surfactant includes Stepfac-8171 available from Stepan Products of Northfield, Ill. A suitable surface tension reducer includes BYK-333 available from BYK USA Inc. of Wallingford, Conn.

Additionally, in sample B only, copper nanoparticles were mixed into the liquid coating solution. The copper nanoparticles, which were obtained from Ames Goldsmith Corp. of South Glens Falls, N.Y., had an average diameter of about 350 nanometers (nm).

Table 1 below lists the amount of each material added to the liquid coating solution for each sample in weight (grams) and weight percent (Wt %).

TABLE 1

| Sample Weight and Weight % of Each Component | | | | |
|---|---|---|---|---|
| | Sample A | | Sample B | |
| | Weight | Wt % | Weight | Wt % |
| Polyamidic acid solution in NMP | 44.53 g | 74.71 | 41.3 g | 71.05 |
| non-ionic surfactant | 0.14 g | 0.23 | 0.13 g | 0.22 |
| surface tension reducer | 0.01 g | 0.02 | 0.01 g | 0.02 |
| copper nanoparticles | 0.00 g | 0.00 | 0.39 g | 0.67 |
| NMP | 14.92 g | 25.03 | 16.3 g | 28.04 |

The polyamidic acid solution (i.e., U-Varnish) in Table 1 includes 18 wt % polyimide and 82 wt % NMP. Table 2 lists the total wt % of each material for the two samples.

TABLE 2

| Material Weight % | | | | |
|---|---|---|---|---|
| | Sample A | | Sample B | |
| | Weight | Wt % | Weight | Wt % |
| Polyimide | 8.02 g | 13.46 | 7.43 | 12.78 |
| non-ionic surfactant | 0.14 g | 0.23 | 0.13 | 0.22 |
| surface tension reducer | 0.01 g | 0.02 | 0.01 | 0.02 |
| copper nanoparticles | 0.00 | 0.00 | 0.39 g | 0.67 |
| NMP | 51.43 | 86.29 | 50.17 | 86.31 |

After providing each sample mixture, each sample was milled using stainless steel beads for a duration of 30 minutes. Subsequent to milling, the milling medium was filtered off. Next, each sample liquid coating solution was coated onto a solid substrate, more specifically onto a stainless steel substrate, using a 10 mil Bird bar.

After dispensing onto the solid substrate, the coatings were dried and cured to a flexible solid state by baking out the solvents using a first heating stage at a temperature of 65° C. for 30 minutes, followed by a second heating stage at a temperature of 135° C. for 30 minutes, followed by a third heating stage at a temperature of 285° C. for 45 minutes. After curing and cooling the fuser belts to room temperature, the belts were removed from the solid substrate. Subsequent to curing, the resulting fuser belts had a nominal thickness ranging from about 1 mil to about 3 mil. After removing the volatile components during the cure process, the copper reinforced fuser belt of sample B included copper nanoparticles at 7 wt %, dispersed evenly throughout the fuser belt.

The films were analyzed by differential scanning calorimetry (DSC) under nitrogen and by thermal gravimetric analysis (TGA) under air and nitrogen respectively. DSC traces were used to calculate the heat capacity of the films at different temperatures. TGA data were analyzed to compare the thermal stability of the films.

FIG. 1 is a graph depicting the heat capacity of the fuser belts formed using the two testing samples. The Sample A fuser belt included no copper, while the Sample B fuser belt included 7 wt % copper nanoparticles. Samples B demonstrates a lower heat capacity, and therefore a higher thermal conductivity.

Table 3 summarizes the TGA results for Sample A and Sample B under nitrogen and air.

TABLE 3

| TGA Results in Nitrogen and Air | | |
|---|---|---|
| TGA Test | Sample A | Sample B |
| % Weight Loss 100° C. to 200° C. in $N_2$ | 0.90 | 0.00 |
| % Weight Loss 100° C. to 500° C. in $N_2$ | 5.30 | 3.60 |
| % Weight Loss 500° C. to 850° C. in $N_2$ | 32.80 | 33.40 |
| % Residue at 850° C. | 62.00 | 63.00 |
| % Weight Loss 100° C. to 500° C. in Air | 4.20 | 4.40 |
| % Weight Loss 500° C. to 850° C. in Air | 95.20 | 95.30 |

The polyimide fuser belt of Sample B which included 7 wt % copper nanoparticles demonstrated a better thermal stability than the fuser belt of Sample A without copper nanoparticles.

The Young's modulus and break strength of the fuser belts were also tested using an Instron (Norwood, Mass.) 6022 Floor Model Testing System. The test results showed that Sample A (pure polyimide) had a Young's modulus of 5578 megapascals (MPa) and a break strength of 186.0 MPa. Test results from Sample B, which included 7 wt % copper nanoparticles, showed a Young's modulus of 5773 MPa and a break strength of 169.6 MPa. Thus the mechanical properties of the fuser belt manufactured with copper nanoparticles are slightly reduced, but they are comparable.

To summarize, the fuser belt formed from a polyamidic acid solution in NMP and reinforced with copper nanoparticles demonstrated a heat capacity which was reduced compared to a fuser belt without copper nanoparticles. The fuser belt with copper nanoparticles had slightly improved thermal stability. The liquid coating solution included a non-ionic surfactant and a surface tension reducer, and sufficient coating of the material on the solid substrate was achieved. No additional release coating was necessary, as the material demonstrated sufficient release from the stainless steel solid substrate.

The liquid coating solution can be prepared by first providing the components together within a solution. The polyimide component can include a solution of about 18 wt % solid content in about 82 wt % solvent, for example NMP. The polyimide component can be provided within the solution as a percentage, by weight, of between about 50.0 wt % and about 99.8 wt %, or between about 55 wt % and about 95 wt %, or between about 60 wt % and about 80 wt %. It will be understood that if each of the polyimide and solvent (e.g., NMP) are mixed as separate material or have different starting wt % (i.e., not using premixed U-Varnish), adjustment of the material quantities to result in an equivalent final wt % as described can be performed to produce the liquid coating solution and the fuser belt. For example, the polyimide component for the completed liquid coating solution can have a total solid content of between about 0.1 wt % to about 60 wt %, or between about 5 wt % to about 40 wt %, or between about 10 wt % and about 30 wt %. The polyimide component can have a total solvent content of between about 40 wt % and about 99.9 wt %, or between about 60 wt % and about 95 wt %, or between about 70 wt % and about 90 wt %.

The copper nanoparticles can have an average diameter of from about 5 nm to about 500 nm, or between 100 nm to about 450 nm, or from about 200 nm to about 400 nm. The copper nanoparticle component can be provided within the solution as a percentage, by weight, of between about 0.01 wt % and about 3.0 wt %, or between about 0.5 wt % and about 2.0 wt %, or between about 0.8 wt % and about 1.2 wt %. If an insufficient amount of copper nanoparticles is added, the result will be a material which functions more like pure polyimide, and will have a similar heat capacity and heat conductivity. Adding excessive copper nanoparticles can result in a fuser belt which is not sufficiently flexible and which is fragile and prone to early failure.

The non-ionic surfactant, for example Stepfac-8171, is optional can be provided within the solution as a percentage, by weight, of less than 0.50 wt %, or between about 0.01 wt % and about 3 wt %, or between about 0.28 wt % and about 0.34 wt %. In general, the non-ionic surfactant, if used, can be a material which does not have ionic electrical charges, and may be a material which has long C-C molecular chains.

The surface tension reducer, for example BYK-333, is optional and can be provided within the solution as a percentage, by weight, of less than about 0.50 wt %, or between about 0.01 wt % and about 3 wt %, or between about 0.01 wt % and about 0.40 wt %, or between about 0.01 wt % and about 0.03 wt %. In general, the surface tension reducer, if used, can include one or more fluorinated materials such as fluoropolymer and/or one or more silicone materials.

An additional amount of solvent, for example NMP, can be provided within the solution as a percentage, by weight, of between about 10 wt % and about 46 wt %, or between about 20 wt % and about 40 wt %, or between about 25 wt % and about 35 wt %.

After providing the solution components, the solution can be mixed and milled using a milling medium such as stainless steel beads for a duration of between about 10 minutes and about 72 hours, or between about 20 minutes and about 48 hours, or between about 20 hours and about 30 hours, for example about 24 hours. Subsequent to milling, the milling medium is filtered off from the liquid coating solution. The liquid coating solution is collected and dispensed onto a solid substrate, such as a stainless steel substrate, for example by spray coating or dipping. The liquid coating solution is dispensed to a sufficient thickness that the resulting fuser belt, after drying, will have a thickness of between about 0.1 mil and about 10 mil, for example between about 1 mil and about 8 mil.

The solution which coats the solid substrate can be dried and cured, for example using the application of heat. In one process, a first heating stage can include placing the solution and solid substrate into a heat chamber, and ramping the temperature within the chamber to a first target temperature of between about 50° C. and about 120° C., or between about 60° C. and about 100° C., or about 65° C. The solid substrate and liquid coating solution are heated within the chamber at the first target temperature for duration of between about 5 minutes and about 75 minutes, or between about 20 minutes and about 40 minutes, or about 30 minutes. This can be followed by a second heating stage, which can include ramping the chamber temperature to a second target temperature of between about 120° C. and about 190° C., or between about 120° C. and about 150° C., or about 135° C. The solid substrate and liquid coating solution are heated within the chamber at the second target temperature for a duration of between about 10 minutes and about 80 minutes, or between about 20 minutes and about 40 minutes, or about 30 minutes. This can be followed by a third heating stage, which can include ramping the chamber temperature to a third target temperature of between about 250° C. and about 450° C., or between about 270° C. and about 300° C., for example about 285° C. The solid substrate and liquid coating solution are heated within the chamber at the third target temperature for a duration of between about 10 minutes and about 2 hours, or between about 30 minutes and 1 hour, or about 45 minutes.

The composition of the fuser belt which is ready for use can have a composition. For example, the fuser belt can include a cured polyimide of between about 85 wt % and about 99.9 wt %, or about 87 wt % and about 99.5 wt %, or about 92 wt % and about 99 wt %. The fuser belt can further include copper nanoparticles of between about 0.1 wt % and about 15 wt %, or between about 0.5 wt % and about 13 wt %, or between about 6 wt % and about 8 wt %, for example 7 wt %.

The fuser belt formed according to the present teachings can have a break strength of between about 20 MPa and about 500 MPa, or between about 50 MPa and about 400 MPa, or between about 80 MPa and about 350 MPa. Additionally, the fuser belt can have a Young's modulus of between about 1000

MPa and about 10000 MPa, or between about 2000 MPa and about 9000 MPa, or between about 3000 MPa and about 8000 MPa.

Additionally, the fuser belt formed according to the present teaching can have a heat capacity at 50° C. of between about 0.75 Jules/gram·° C. (J/g·° C.) and 1.25 J/g·° C., or between about 0.9 J/g·° C. and 1.2 J/g·° C., or between about 1.0 J/g·° C. and about 1.1 J/g·° C. At 100° C., the fuser belt can have a heat capacity of between about 0.4 j/g·° C. and 0.9 J/g·° C., or between about 0.5 J/g·° C. and 0.7 J/g·° C., or between about 0.55 J/g·° C. and about 0.7 J/g·° C. At 150° C., the fuser belt can have a heat capacity of between about 0.1 J/g·° C. and 0.3 J/g·° C., or between about 0.15 J/g·° C. and 025 J/g·° C., or between about 0.19 J/g·° C. to about 0.23 J/g·° C. It will be realized that this data is strongly dependent on the measurement system used to provide the measurement, and thus the data may not be comparable between different systems. The data was measured by DSC.

Figure 2:
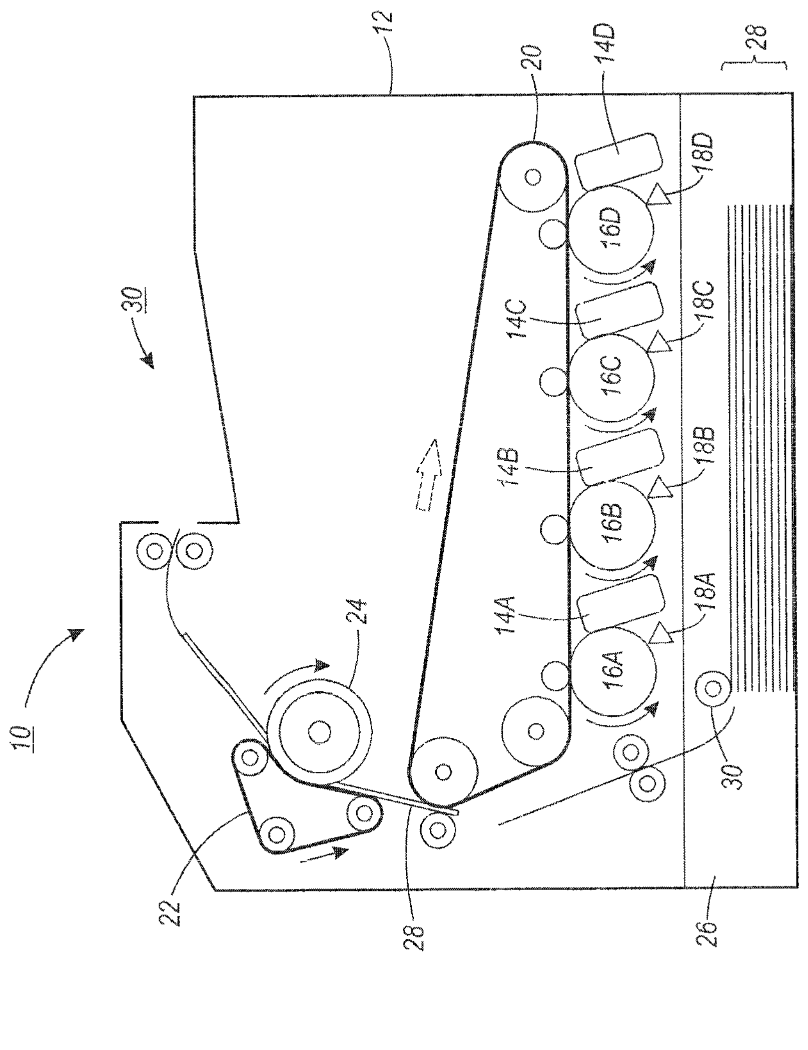
FIG. 2 is a cross section of an electrostatoaraphic printing device which includes a fuser belt according to the present teachings.

The fuser belt can be used in various electrostatographic devices such as printers, digital copiers, bookmaking machines, facsimile machines, multi-function machines, etc. FIG. 2 depicts an example of an electrostatographic apparatus, and in particular a color laser printer, having a fuser belt in accordance with an embodiment of the present teachings. The printer 10 of FIG. 1 can include a housing 12 and at least one, or a plurality of color toner cartridges 14A-14D. Toner within the plurality color toner cartridges can be, for example, cyan, magenta, yellow and black (i.e., CMYK). The printer 10 can further include at least one, or a plurality of photoreceptors (i.e., drums) 16A-16D each configured to receive a latent image, and at least one, or a plurality of charging devices 18A-18D configured to write a latent image onto the at least one photoreceptor 16A-16D. The image forming apparatus can further include an intermediate transfer belt 20 configured to receive a toner image from the at least one photoreceptor and to transfer the toner image to a permanent substrate, a fuser belt 22, and a pressure roller 24. The fuser belt 22 is configured to fuse the toner image to the permanent substrate. A hopper 26 such as a paper tray can store a plurality of permanent substrates 28, such as sheets of plain paper, plastic, or other print media, collectively referred to herein for ease of explanation as "paper." The printer 10 can further include a pickup roller 30 and an exit hopper or platform 32.

In use, image data containing pattern and color information is processed, for example by a microprocessor. A patterned latent electrostatic image corresponding to the pattern and color information is written onto one or more of the rotating photoreceptors 16A-16D using the corresponding charging device 18A-18D. The latent electrostatic image on each photoreceptor 16A-16D attracts toner from the corresponding toner cartridge 14A-14D, to reproduce the patterned electrostatic image in color toner on the photoreceptor 16A-16D. The toner is then transferred from each photoreceptor 16A-16D to the intermediate transfer belt 20. A paper sheet 28 is removed from the tray 26 by the pickup roller 30. The toner image is transferred to the paper 28 through pressure contact with the intermediate transfer belt 20. The image is then fixed or fused to the paper with heat supplied by the fuser belt 22 and through pressure between the fuser belt 22 and the pressure roller 24. After fixing the image onto the paper 28, the paper 28 can be transferred to the exit tray 30.

A printer can include additional structures and image forming can include additional materials and processes which have not been described for simplicity of explanation.

Embodiments can thus include a fuser belt, methods for forming the fuser belt, and electrostatographic devices including the fuser belt. The fuser belt can be formed at a reasonable cost and provide good operating characteristics, for example a decreased heat capacity and an increased thermal conductivity over conventional fuser belts.

Notwithstanding that the numerical ranges and parameters setting forth the broad scope of the present teachings are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g. −1, −2, −3, −10, −20, −30, etc.

While the present teachings have been illustrated with respect to one or more implementations, alterations and/or modifications can be made to the illustrated examples without departing from the spirit and scope of the appended claims. In addition, while a particular feature of the disclosure may have been described with respect to only one of several implementations, such feature may be combined with one or more other features of the other implementations as may be desired and advantageous for any given or particular function. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items can be selected. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "conformal" describes a coating material in which angles of the underlying material are preserved by the conformal material. The term "about" indicates that the value listed may be somewhat altered, as long as the alteration does not result in nonconformance of the process or structure to the illustrated embodiment. Finally, "exemplary" indicates the description is used as an example, rather than implying that it is an ideal. Other embodiments of the present teachings will be apparent to those skilled in the art from consideration of the specification and practice of the disclosure herein. It is intended that the specification and examples be considered as exemplary only, with a true scope and spirit of the present teachings being indicated by the following claims.

Terms of relative position as used in this application are defined based on a plane parallel to the conventional plane or working surface of a wafer or substrate, regardless of the orientation of the wafer or substrate. The term "horizontal" or "lateral" as used in this application is defined as a plane parallel to the conventional plane or working surface of a wafer or substrate, regardless of the orientation of the wafer or substrate. The term "vertical" refers to a direction perpendicular to the horizontal. Terms such as "on," "side" (as in "sidewall"), "higher," "lower," "over," "top," and "under" are defined with respect to the conventional plane or working surface being on the top surface of the wafer or substrate, regardless of the orientation of the wafer or substrate.

The invention claimed is:

1. A fuser belt for an electrostatographic image forming device, comprising:
   a polyimide comprising between about 92 wt % and about 99 wt % of the fuser belt; and
   a plurality of copper nanoparticles comprising between 6 wt % and 8 wt % of the fuser belt, wherein:
   the plurality of copper nanoparticles have an average diameter of from about 200 nanometers to about 400 nanometers; and
   the fuser belt has a Young's modulus of between about 1000 megapascals and about 10000 megapascals,
   wherein the fuser belt is a seamless cured coating, and
   wherein the fuser belt is a product of curing a mixture of ingredients, the ingredients comprising a polyimide component, copper nanoparticles, a non-ionic surfactant and a surface tension reducer selected from the group consisting of a fluoropolymer, a silicone and combinations thereof.

2. The fuser belt of claim 1, wherein the fuser belt has a break strength of between about 20 megapascals and about 500 megapascals.

3. The fuser belt of claim 1, wherein:
   the fuser belt has a break strength of between about 50 megapascals and about 400 megapascals; and
   the fuser belt has a Young's modulus of between about 2000 megapascals and aboutb 9000 megapascals.

4. The fuser belt of claim 1, wherein:
   the fuser belt has a break strength of between about 80 megapascals and about 350 megapascals; and
   the fuser belt has a Young's modulus of between about 3000 megapascals and about 8000 megapascals.

5. The fuser belt of claim 1, wherein:
   the fuser belt has a heat capacity at 50° C. of between about 0.75 Jules/gram·° C. (J/g·° C.) and 1.25 J/g·° C.;
   the fuser belt has a heat capacity at 100° C. of between about 0.4 J/g·° C. and 0.9 J/g·° C.; and
   the fuser belt has a heat capacity at 150° C. of between about 0.1 J/g·° C. and 0.3 J/g·° C.

6. An electrostatographic image forming apparatus, comprising:
   a fuser belt, comprising:
      a polyimide comprising between about 92 wt % and about 98 wt % of the fuser belt; and
      a plurality of copper nanoparticles comprising between 6 wt % and 8 wt % of the fuser belt, wherein
      the fuser belt has a break strength of between about 20 megapascals and about 500 megapascals; and
      the fuser belt has a Young's modulus of between about 1000 megapascals and about 10000 megapascals;
   at least one photoreceptor configured to receive a latent image; and
   at least one charging device configured to write the latent image onto the at least one photoreceptor,
   wherein the fuser belt is a seamless cured coating and is configured to supply heat sufficient for fusing a toner image onto a permanent substrate, and
   wherein the fuser belt is a product of curing a mixture of ingredients, the ingredients comprising a polyimide component, copper nanoparticles, a non-ionic surfactant and a surface tension reducer selected from the group consisting of a fluoropolymer, a silicone and combinations thereof.

7. The electrostatographic image forming apparatus of claim 6, wherein:
   the fuser belt has a break strength of between about 50 megapascals and about 400 megapascals; and
   the fuser belt has Young's modulus of between about 2000 megapascals and about 9000 megapascals.

8. The electrostatographic image forming apparatus of claim 6, wherein:
   the fuser belt has a break strength of between about 50 megapascals and about 400 megapascals; and
   the fuser belt has a Young's modulus of between about 3000 megapascals and about 8000 megapascals.

* * * * *